(12) United States Patent
Yagi et al.

(10) Patent No.: US 6,347,894 B1
(45) Date of Patent: Feb. 19, 2002

(54) LIGHT SHUTTER DEVICE

(75) Inventors: Tsukasa Yagi, Kobe; Isao Doi, Toyonaka; Yuji Kamoda, Nishinomiya, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/614,197

(22) Filed: Jul. 12, 2000

(30) Foreign Application Priority Data

Jul. 14, 1999 (JP) .......................................... 11-200018

(51) Int. Cl.$^7$ .............................. G02F 1/00; G02F 1/03; G02F 1/07; G02F 1/1333

(52) U.S. Cl. ........................ 396/457; 359/254; 359/323; 349/56

(58) Field of Search ................................ 396/249, 262, 396/457, 506; 349/2, 3, 4, 56; 359/271, 254, 322, 323, 237

(56) References Cited

U.S. PATENT DOCUMENTS

| | | | | |
|---|---|---|---|---|
| 4,753,517 A | * | 6/1988 | Samek ........................ | 359/254 |
| 4,766,445 A | | 8/1988 | Springer ..................... | 346/108 |
| 4,854,678 A | * | 8/1989 | Kitano et al. ............... | 359/254 |
| 5,029,989 A | * | 7/1991 | Phillips ...................... | 359/276 |

FOREIGN PATENT DOCUMENTS

JP        60-159722        8/1985

\* cited by examiner

*Primary Examiner*—David M. Gray
*Assistant Examiner*—Rochelle Blackman
(74) *Attorney, Agent, or Firm*—Sidley Austin Brown & Wood

(57) ABSTRACT

A light shutter device which, on a planar PLZT substrate, has a plurality of light transmitting portions (light shutter elements) which are disposed in two groups separated by a common electrode, and individual electrodes provided for the respective elements. Adjacent light shutter elements in each of the groups are arranged in mutually different lines so as to inhibit crosstalk.

14 Claims, 6 Drawing Sheets

LIGHT SHUTTER DEVICE

This application is based on application No. 11-200018 filed in Japan, the content of which is hereby incorporated by reference.

BACKGROUND OF THE INVENTION

1. Field of the Invention

The present invention relates to a light shutter device, and more particularly to a light shutter device which has a plurality of light shutter elements on a substrate made of a material with an electro-optical effect and which controls turning-on and turning-off of the light by applying a voltage to the light shutter elements.

2. Description of Prior Art

There have been provided various kinds of light shutter devices to form an image on a silver salt print paper, a silver salt film or a photosensitive member. Such a light shutter device has arrays of light shutter tips made of PLZT, which has an electro-optical effect, and controls turning-on and turning-off pixel by pixel.

Specifically, as FIG. 5 shows, when a voltage is applied to a pair of electrodes 32 and 33 provided on a light shutter tip 30, birefringence by the PLZT of the light shutter tip 30 becomes possible. In this state, light which is incident to a light transmitting portion (light shutter element) 31 via a polarizer 35 is polarized by the PLZT at 90 degrees, and the light emergent from the light transmitting portion 31 passes through an analyzer 36. In this way, light is turned on and off.

FIG. 6 shows an example of the electrode structure of a conventional light shutter tip. In the tip 30, in two scan lines X to write one line, light shutter elements 31a, 31b, ... are arranged. On respective one sides of the light shutter elements, individual electrodes 32a, 32b, ... are provided, and on the other sides, a common electrode 33 which is connected to the ground is provided.

Such light shutter elements are driven with a half-wave voltage applied thereto so as to obtain the maximum light transmittance; however, crosstalk occurs between adjacent light shutter elements on each of the scan lines X, which fluctuates the light transmittance. For example, focusing on the element 31c, the light transmittance characteristic when only the element 31c is turned on is shown by the curve A in FIG. 7. The curve B in FIG. 7 shows the light transmittance characteristic of the element 31c when the neighboring elements are also turned on simultaneously with the element 31c; in this case, the light transmittance decreases. The light transmittance of the element 31c when a half-wave voltage is applied to the element 31c and the neighboring elements is approximately 10% lower than that when the half-wave voltage is applied only to the element 31c.

In order to solve this problem, as FIG. 8 shows and as Japanese Patent Laid Open Publication No. 60-159722 suggested, shield electrodes 34a, 34b... which extend from the common electrode 33 to among the light shutter elements 31a, 31b... are provided. FIG. 8 shows only the part around one of the two scan lines X.

In this structure, however, the shield electrodes 34a, 34b... and the individual electrodes 32a, 32b... are very close to each other, and it is difficult to adapt this structure for a high-definition device. Also, large capacitance occurs among the individual electrodes and the shield electrodes, which results in an increase in electric power consumption. Moreover, as the shield electrodes are thinned, the effect becomes weak, and in this point, also, this structure is not suited for a high-definition device.

SUMMARY OF THE INVENTION

An object of the present invention is to provide a light shutter device which inhibits crosstalk from occurring between adjacent light shutter elements, which can be adopted to achieve high definition and which does not increase electric power consumption.

In order to attain the object, a light shutter device according to the present invention comprises: a substrate made of a material with an electro-optical effect; a common electrode which extends in a specified direction on the substrate; a plurality of individual electrodes which are arranged by a side of the common electrode along the common electrode; and a plurality of light shutter elements which are located between the respective individual electrodes and the common electrode and which are driven by application of a voltage between the respective individual electrodes and the common electrode. In the light shutter device, the light shutter elements are arranged in such a way that adjacent light shutter elements are located in mutually different positions with respect to a direction perpendicular to the common electrode extending direction.

In the structure, since adjacent light shutter elements are arranged in mutually different lines in parallel to the common electrode extending direction, the distances among the elements are long. Therefore, the crosstalk among the elements is small, and the light transmittance of each element when all the elements are turned on is the same as that when only one element is turned on. Moreover, it is not necessary to provide shield electrodes among the elements, which means that adaptation for a high-definition device is possible and that the consumption of electric power does not increase.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Figure 5:
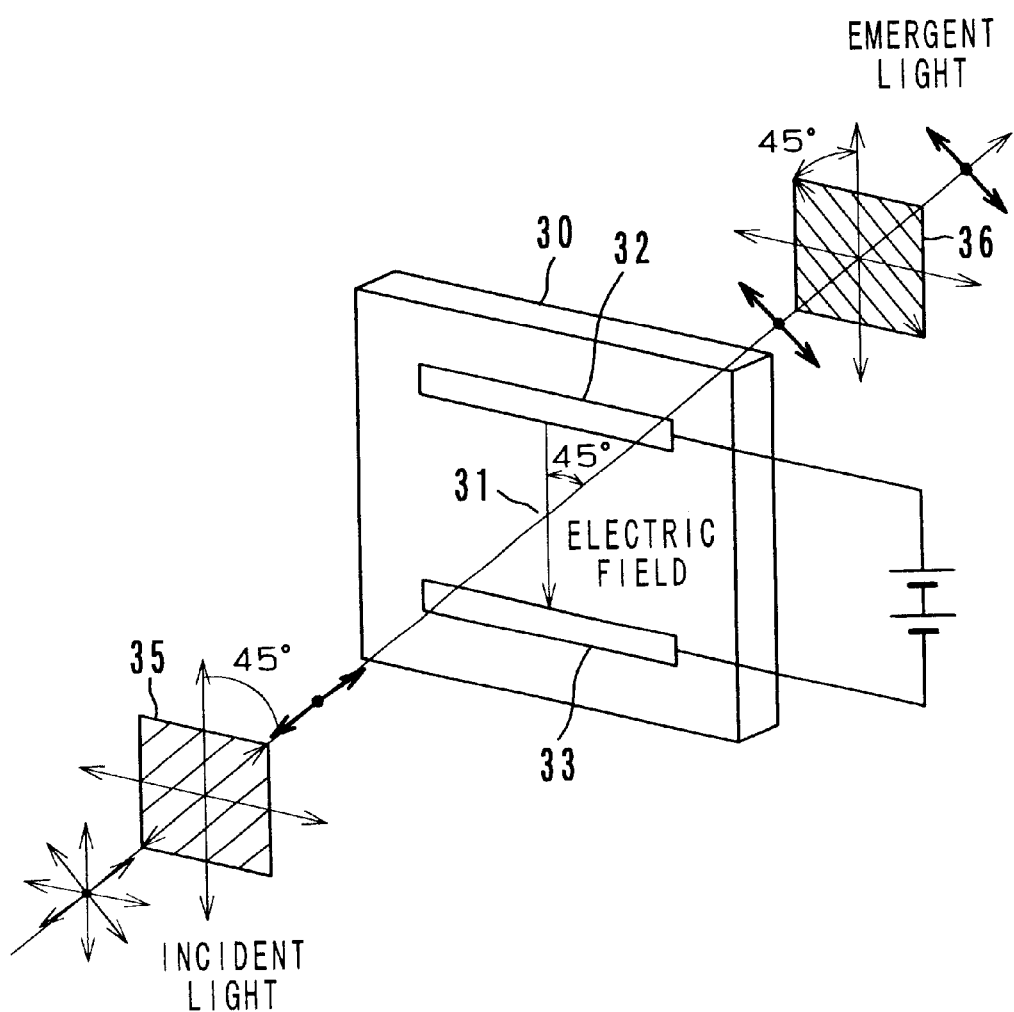
FIG. 5 is a perspective view which shows the principle of operation of a light shutter device.

Preferred embodiments of a light shutter device according to the present invention are described with reference to the accompanying drawings. The embodiments operate (turn on and off the light) in the well-known principle shown by FIG. 5, and repetition of the description will be avoided.

First Embodiment; See FIG. 1

Figure 1:
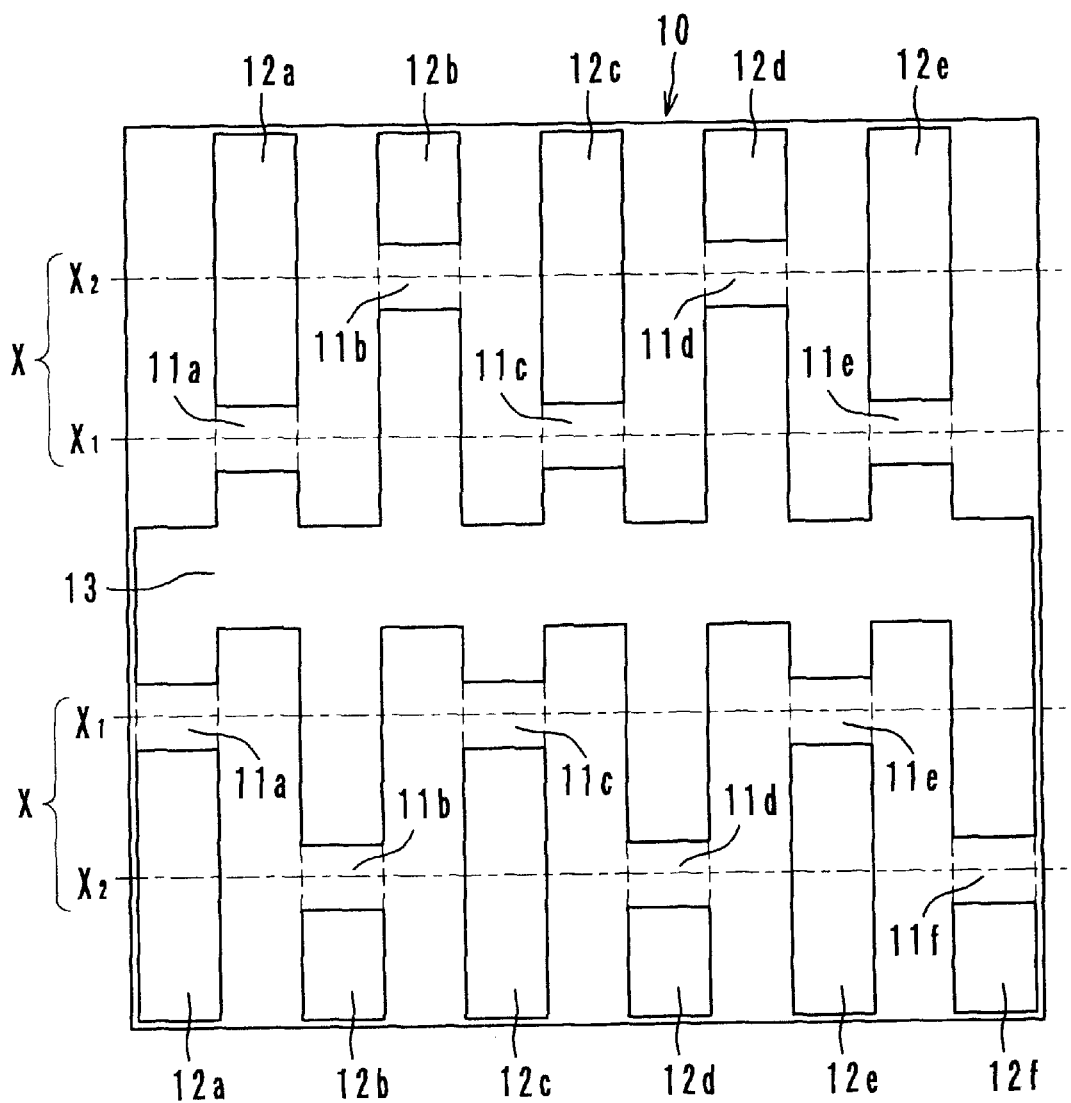
FIG. 1 is a plan view of the principal part of a light shutter device which is a first embodiment of the present invention.

FIG. 1 shows the principal part of a light shutter device which is a first embodiment of the present invention. In the light shutter device, on a planar PLZT tip 10, a plurality of light transmitting portions (light shutter elements) 11a, 11b, . . . are arranged in two pairs of scan lines $X_1$ and $X_2$, and adjacent elements are arranged in mutually different lines. Each pair of scan lines $X_1$ and $X_2$ correspond to each of the scan lines X shown in FIG. 6.

In accordance with the arrangement of the elements 11a, 11b, . . . , individual electrodes 12a, 12b, . . . and a common electrode 13 are patterned.

Figure 6:
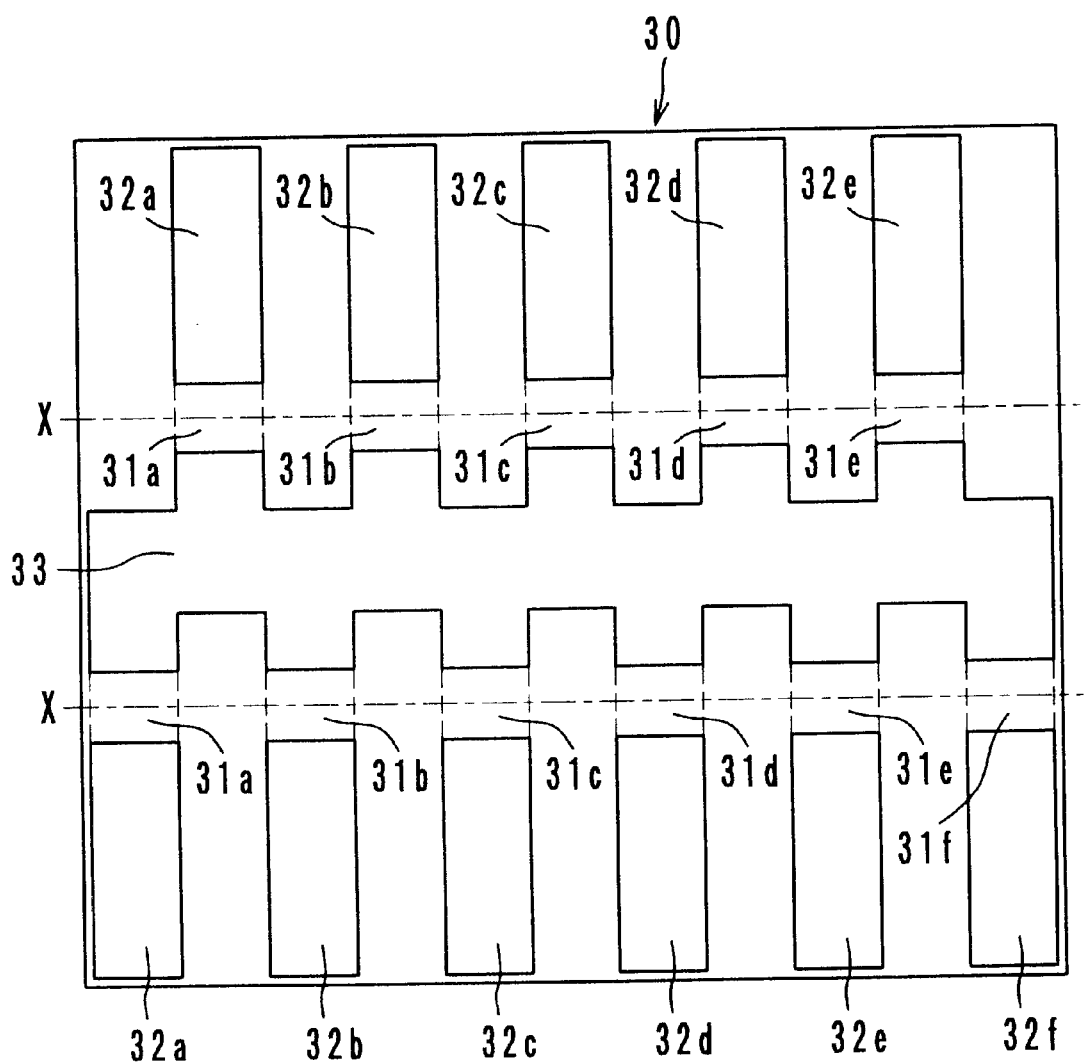
FIG. 6 is a plan view of a conventional light shutter device.
Figure 7:
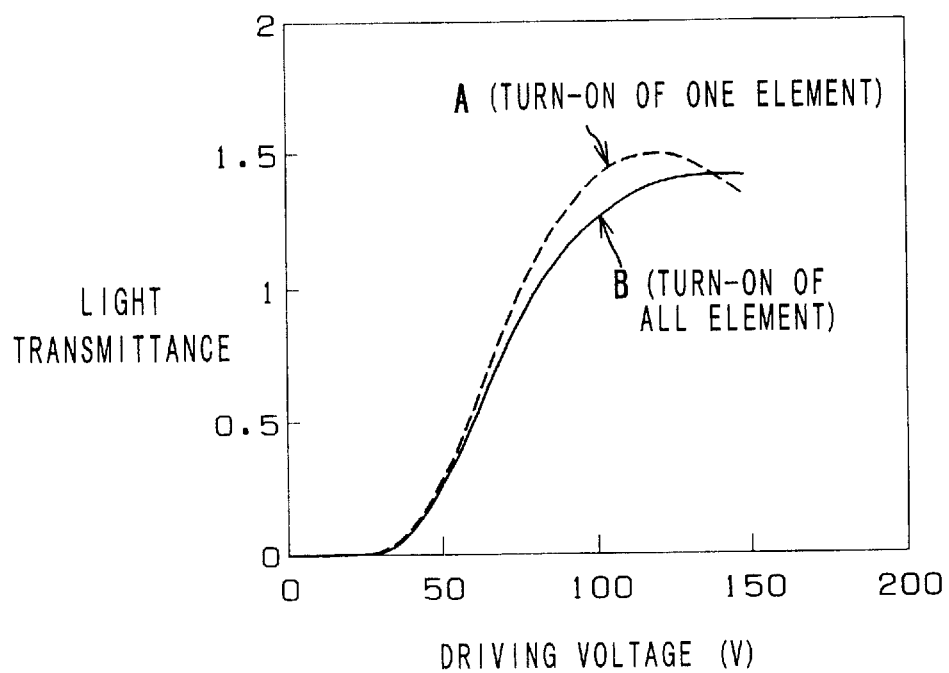
FIG. 7 is a graph which shows the relationship between the driving voltage and the light transmittance in the light shutter device of FIG. 6.
Figure 8:
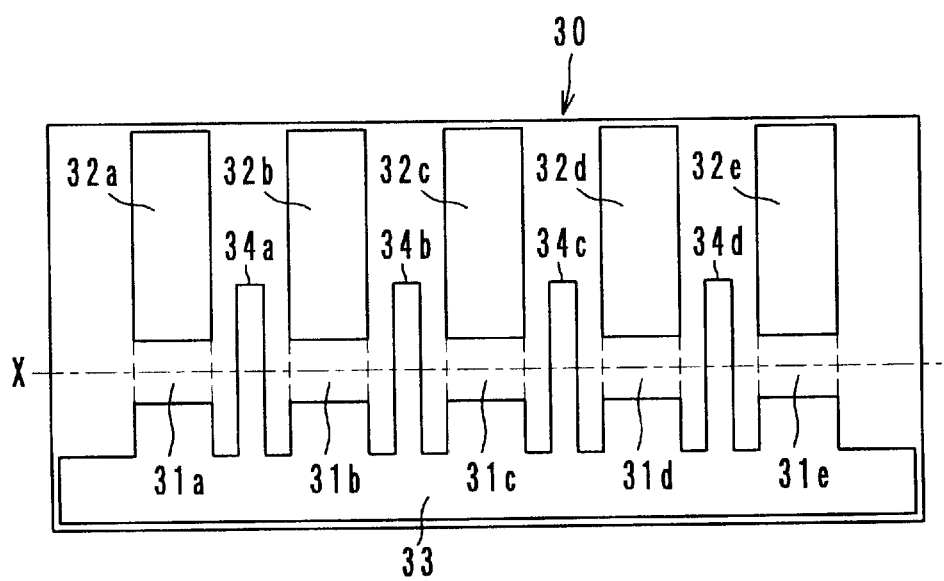
FIG. 8 is a plan view of another conventional light shutter device.

The light shutter elements 11a, 11b, . . . , which belong to one scan line X in the conventional structure shown by FIG. 6, are arranged in two lines $X_1$ and $X_2$ alternately in the first embodiment. Therefore, the distances among the elements are long. Also, the common electrode 13 extend to the vicinity of each of the elements, which brings a shield effect. Thereby, crosstalk at the time of application of a voltage is inhibited, and the consumption of electric power is reduced.

Figure 2:
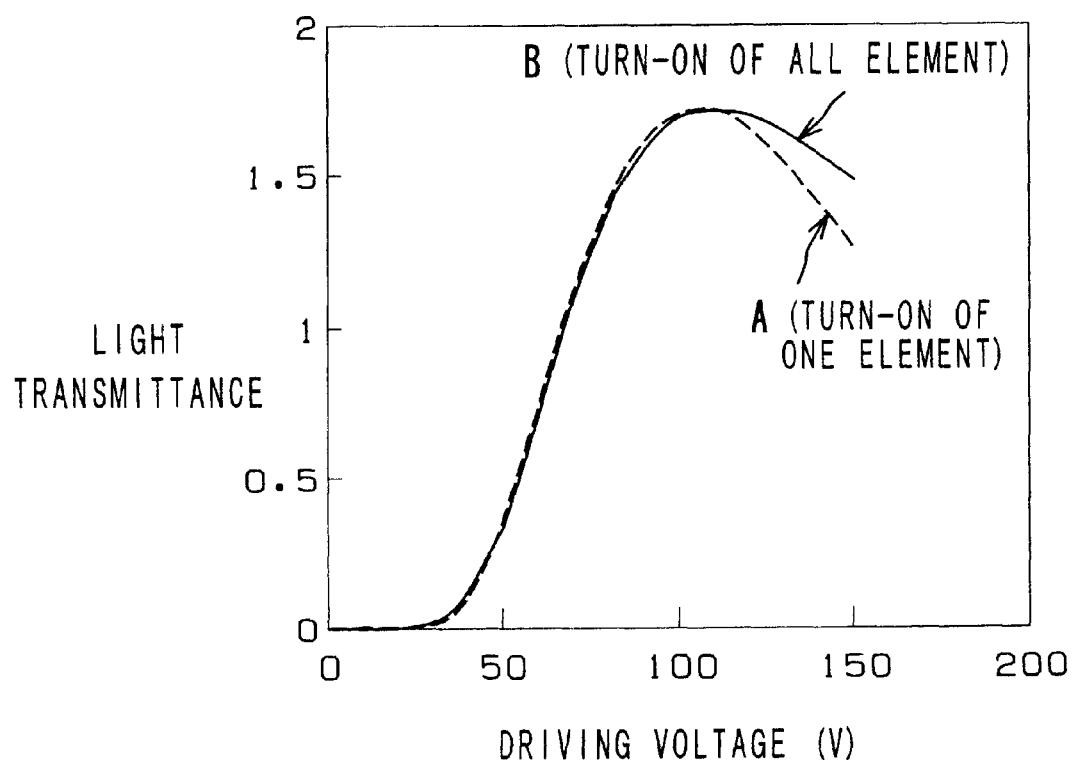
FIG. 2 is a graph which shows the relationship between the driving voltage and the light transmittance in the light shutter device.

FIG. 2 shows the relationship between the driving voltage and the light transmittance in the first embodiment. Here, the distance between the centers of two adjacent light shutter elements is approximately 1.25 times of that in the conventional structure shown by FIG. 6. In FIG. 2, the curve A shows the light transmittance characteristic of a light shutter element when only the element is turned on, and the curve B shows the light transmittance characteristic of the light shutter element when the element and the neighboring elements are turned on. As is apparent from these curves A and B, substantially, neither fluctuation of the half-wave voltage nor reduction of the light transmittance occurs.

The crosstalk decreases in inverse proportion to the distances among the light shutter elements, and when the distances among the light shutter elements are approximately 1.5 times of those in the conventional structure shown by FIG. 6, there occurs almost no crosstalk. As the distances among the light shutter elements become longer, however, the power of the light source must be strengthened. Accordingly, the distances among the elements shall be designed in consideration for the shutter performance and other factors.

In the first embodiment, since the pixels which are arranged on one line X in the conventional structure are arranged in two lines $X_1$ and $X_2$ alternately, it is necessary to produce image signals for the respective lines $X_1$ and $X_2$. In order to write one line on a receiving surface, the total of four scan lines are controlled with time lags.

Second Embodiment

Figure 3:
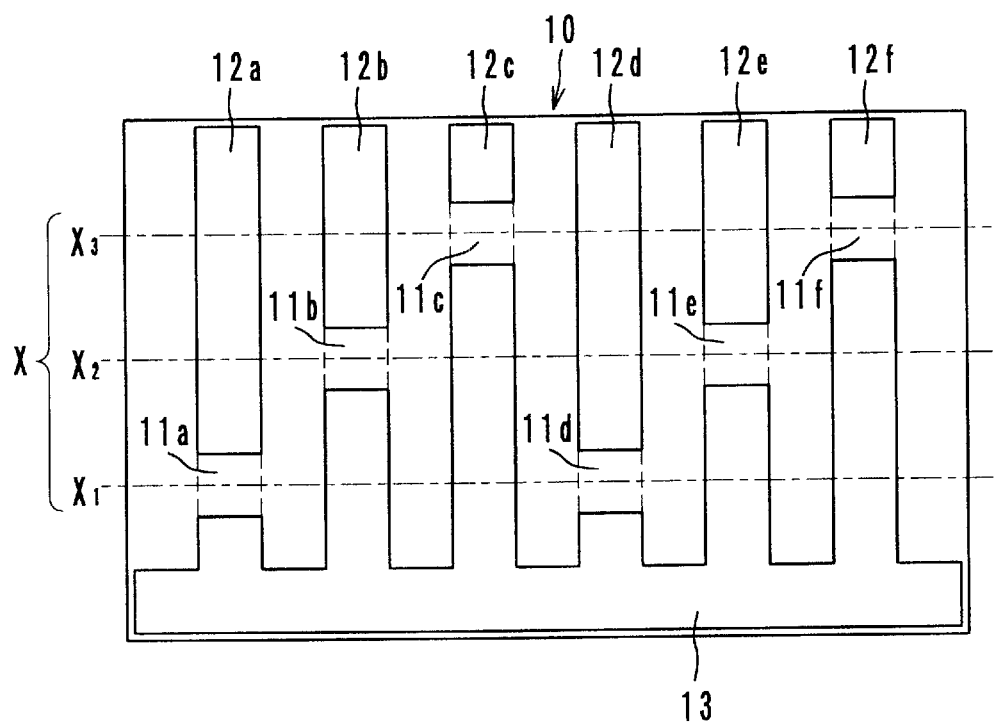
FIG. 3 is a plan view of the principal part of a light shutter device which is a second embodiment of the present invention.

FIG. 3 shows the principal part (corresponding to the part around one scan line X in the conventional structure) of a light shutter device which is a second embodiment of the present invention. In the light shutter device, the light shutter elements 11a, 11b, . . . , which are arranged in one scan line X in the conventional structure, are arranged in three lines $X_1$, $X_2$ and $X_3$, and adjacent elements are arranged in the three lines $X_1$, $X_2$ and $X_3$ in this order. The second embodiment acts in the same way and brings the same effect as the first embodiment.

Third Embodiment

Figure 4:
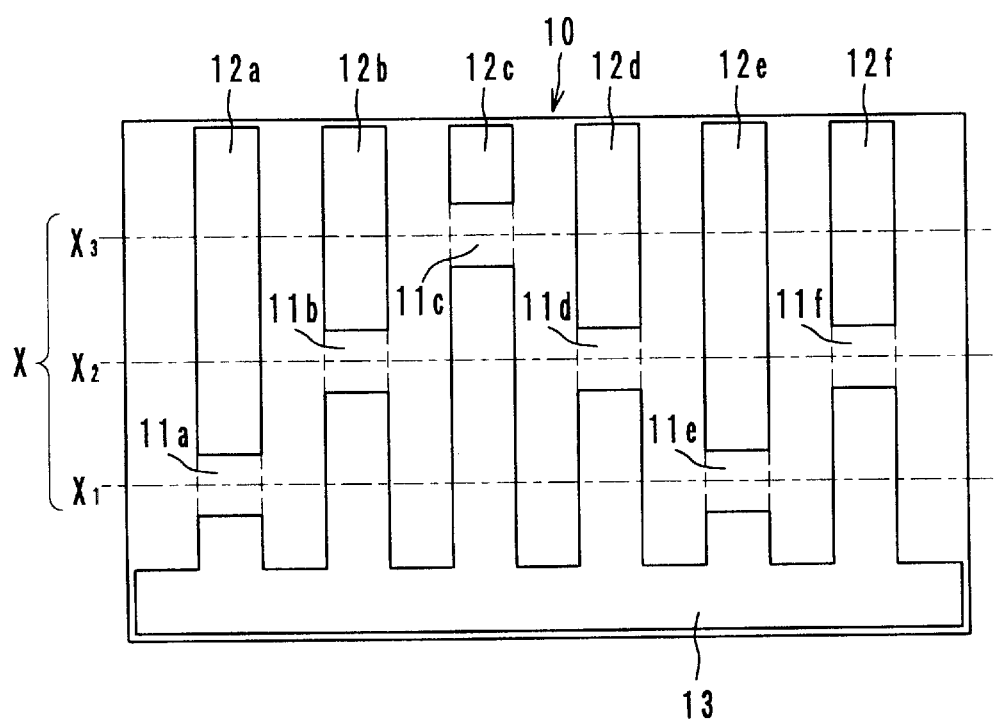
FIG. 4 is a plan view of the principal part of a light shutter device which is a third embodiment of the present invention.

FIG. 4 shows the principal part (corresponding to the part around one scan line X in the conventional structure) of a light shutter device which is a third embodiment of the present invention. In the light shutter device, the light shutter elements 11a, 11b, . . . , which are arranged in one scan line X in the conventional structure, are arranged in three lines $X_1$, $X_2$ and $X_3$ as those of the second embodiment are; however, adjacent elements are arranged on $X_1$, $X_2$, $X_3$, $X_3$, $X_2$, $X_1$, . . . in this order. The third embodiment acts in the same way and brings the same effect as the first embodiment and the second embodiment.

Other Embodiments

As the material with an electro-optical effect, $LiNbO_3$ as well as PLZT are usable. The number of lines in which the light transmitting portions (light shutter elements) are arranged and the details of the electrode pattern are arbitrary.

Although the present invention has been described in connection with the preferred embodiments above, it is to be noted that various changes and modifications are possible to those who are skilled in the art. Such changes and modifications are understood as being within the scope of the present invention.

What is claimed is:

1. A light shutter device comprising:
   a substrate made of a material with an electro-optical effect;
   a common electrode which extends in a specified direction on the substrate;
   a plurality of individual electrodes which are arranged along a side of the common electrode; and
   a plurality of light shutter elements, each of which is located between a respective individual electrode and the common electrode and which is driven by application of a voltage between the respective individual electrode and the common electrode,
   wherein each of the plurality of light shutter elements is arranged in such a way that mutually adjacent light shutter elements are located in mutually different positions with respect to a direction perpendicular to the specified direction.

2. A light shutter device according to claim 1, wherein the plurality of light shutter elements are arranged in a zigzag fashion.

3. A light shutter device according to claim 1, wherein the common electrode has protrusions, each of which protrudes in a direction perpendicular to the specified direction towards a respective one of the individual electrodes.

4. A light shutter device according to claim 1, wherein the plurality of light shutter elements comprises a plurality of groups of light shutter elements, each of the groups of light shutter elements being in a respective line which is parallel to the specified direction, wherein each of the groups of light shutter elements is controlled at a respective time, and wherein the groups of light shutter elements are controlled line by line with respect to the direction perpendicular to the specified direction.

5. A light shutter device according to claim 1, wherein each of the light shutter elements is arranged in one of two lines which are parallel to the specified direction.

6. A light shutter device according to claim 1, wherein each of the light shutter elements is arranged in one of three lines which are parallel to the specified direction.

7. A light shutter device according to claim 6, wherein each of the light shutter elements is located at a fixed distance from an adjacent light shutter element.

8. A light shutter device according to claim 6, wherein at least one of the light shutter elements is located at a first distance from a first adjacent light shutter element and at a second distance from a second adjacent light shutter element, wherein the first distance is different from the second distance.

9. A light shutter device comprising:

a substrate made of a material with an electro-optical effect;

a common electrode which extends in a specified direction on the substrate;

a first group of individual electrodes which are arranged by a side of the common electrode along the common electrode;

a first group of light shutter elements which are located between the respective individual electrodes in the first group and the common electrode and which are driven by application of a voltage between the respective individual electrodes in the first group and the common electrode;

a second group of individual electrodes which are arranged by the other side of the common electrode along the common electrode; and a second group of light shutter elements which are located between the respective individual electrodes in the second group and the common electrode and which are driven by application of a voltage between the respective individual electrodes in the second group and the common electrode;

wherein each of the plurality of light shutter elements in each of the groups is arranged in such a way that mutually adjacent light shutter elements are located in mutually different positions with respect to a direction perpendicular to the specified direction.

10. A light shutter device comprising:

a substrate made of a material with an electro-optical effect;

a common electrode which extends in a specified direction on the substrate;

a plurality of individual electrodes which are arranged by a side of the common electrode along the common electrode; and a plurality of light shutter elements which are located between the respective individual electrodes and the common electrode and which are driven by application of a voltage between the respective individual electrodes and the common electrode;

wherein each of the plurality of light shutter elements is arranged in one of a plurality of lines, each of said plurality of lines being parallel to the specified direction, wherein each light shutter element is arranged in a different one of the plurality of lines from each respective adjacent light shutter element.

11. A light shutter device according to claim 10, wherein the plurality of light shutter elements comprises a plurality of groups of light shutter elements, each of the groups of light shutter elements being in a respective line which is parallel to the specified direction, wherein each of the groups of light shutter elements is controlled at a respective time, and wherein the groups of light shutter elements are controlled line by line with respect to the direction perpendicular to the specified direction.

12. A light shutter device according to claim 10, wherein the plurality of lines parallel to the specified direction includes at least two lines on each side of the common electrode.

13. A light shutter device according to claim 10, wherein the plurality of lines parallel to the specified direction includes at least three lines on each side of the common electrode.

14. A light shutter device comprising:

a substrate made of a material with an electro-optical effect, a common electrode which extends in a specified direction on the substrate;

a first group of individual electrodes which are arranged by a side of the common electrode along the common electrode; and a first group of light shutter elements which are located between the respective individual electrodes in the first group and the common electrode and which are driven by application of a voltage between the respective individual electrodes in the first group and the common electrode;

a second group of individual electrodes which are arranged by the other side of the common electrode along the common electrode; and a second group of light shutter elements which are located between the respective individual electrodes in the second group and the common electrode and which are driven by application of a voltage between the respective individual electrodes in the second group and the common electrode;

wherein each of the plurality of light shutter elements in each of the groups is arranged in one of a plurality of lines, each of said plurality of lines being parallel to the specified direction, wherein each light shutter element is arranged in a different one of the plurality of lines from each respective adjacent light shutter element.

* * * * *